June 15, 1965 J. P. SHORT 3,189,494

EPITAXIAL CRYSTAL GROWTH ONTO A STABILIZING LAYER WHICH PREVENTS DIFFUSION FROM THE SUBSTRATE

Filed Aug. 22, 1963

INVENTOR.
John P. Short
BY D. Carl Richards
Attorney 3,189,494

EPITAXIAL CRYSTAL GROWTH ONTO A STABILIZING LAYER WHICH PREVENTS DIFFUSION FROM THE SUBSTRATE

John P. Short, Satellite Beach, Fla., assignor to Texas Instruments Incorporated, Dallas, Tex., a corporation of Delaware Filed Aug. 22, 1963, Ser. No. 303,877
12 Claims. (Cl. 148—175)

Figure 1:
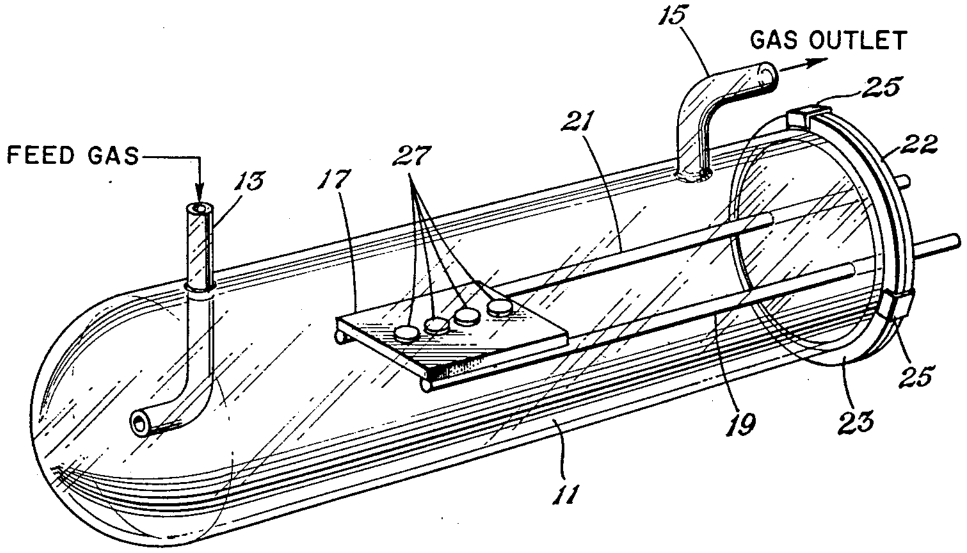

This invention relates to growth of crystals and, more specifically, to the growth of uncontaminated layers of monocrystalline structure of high quality, with a controlled limited diffusion of dopant.

In crystal formation, it has been found advantageous in many instances to employ the epitaxial technique. This technique contemplates the deposition of material onto a like or similar base crystal. Most commonly it is conducted by the deposition from the vapor state of material upon the base. Ideally, the boundary of the deposition film nucleates upon the base to join the lattice thereof to produce a single crystal structure.

It is important that substantially a single crystal be formed if the product is to be utilized for most semiconductor device applications.

The epitaxial crystal growth process is applicable generally to semiconductors, including, for example, silicon, germanium and Group III–V compounds such as gallium phosphide and gallium arsenide.

An important application of the epitaxial technique of crystal formation occurs in forming a P film upon a comparatively thick P+ base crystal as a substrate or in forming an N film upon a comparatively thick N+ substrate. This permits the formation of a comparatively thin crystal which would otherwise not be obtainable. The substrate formed by conventional crystal growth techniques is comparatively thick; however, since dopant content is relatively high, its resistivity is quite low and it functions effectively as a conductive layer. The purpose of the substrate is to provide a crystal base for the nucleation and growth of the epitaxial N or P layer. It does not normally have substantial semiconductive activity in semiconductor devices formed with the resulting epitaxial unit because of its conductive characteristics. Thus, in effect, an epitaxial unit of this type provides a thin layer of semiconductor crystal having substantially the electrical characteristics that would be present in a crystal no thicker than the epitaxial layer itself.

The epitaxial process is commonly conducted at elevated temperatures, for example, around 1300° C., for the epitaxial deposition of silicon upon a silicon substrate. In the case of the growth of a P or N layer upon a P+ or N+ substrate, since the substrate contains a comparatively large amount of dopant, and the epitaxial deposit a comparatively small amount of dopant, considerable diffusion from the substrate to the epitaxial layer will occur during deposition. The amount of dopant in the P+ or N+ substrate is as much as two or three orders of magnitude higher than in the material for the epitaxial film. Since diffusion rates vary exponentially with absolute temperature, it can readily be appreciated that diffusion into the epitaxially growing layer is quite high at the elevated temperatures involved in the process. In general, such diffusion into the epitaxial layer is undesirable since the concentration of the dopant in that layer may be increased, and unevenly, to a high level. Also, to predict the amount of dopant which diffuses into the epitaxial layer and the type of dopant gradient obtained therethrough with great accuracy under such conditions is most difficult in practice, even though theoretically possible.

Moreover, in the epitaxial deposition technique, the high temperature required for efficient deposition of a quality crystal is responsible for considerable contamination. For example, such contamination may be water vapor driven off from various reactor parts and the formation of a certain amount of carbon monoxide in the reactor, which often contains carbon components. Then, too, contamination, as well as inefficiency of reaction, is produced by certain side reactions which tend to occur during epitaxial deposition at high temperature. These side reactions involve not only the primary reactants but also the dopant.

Not only are epitaxial units formed by prior technology subject to problems directly as a result of diffusion and contamination, but in addition, the presence of a diffused region and/or contaminants in a unit make evaluation and quality control of the unit difficult. For example, evaluation of epitaxial film thickness by infrared reflectance techniques has been very difficult because of poor and variable reflectance from the highly diffused boundary region, having a graded refractive index. When later referred to herein, this difficulty in application of infrared technique will be referred to as "poor resolution."

The epitaxial technique is not limited to the growth of a P or N layer upon a P+ or N+ substrate, although this is its most common present application. The technique is applicable to the formation of a semiconductor junction. For example, a P layer may be deposited upon an N layer. Then, in turn, a subsequent P layer might then be epitaxially grown upon the N layer. Thus, semiconductor devices, possessing one or more junctions, may be formed by the epitaxial technique.

In epitaxially formed junctions the elimination or precise control of diffusion would be desirable for many applications. For example, in such devices as a zener diode or a varactor diode the junction must be quite sharp.

The avoidance of contamination in epitaxially grown devices is important, as it is in the case of an epitaxial layer grown upon a N+ or P+ substrate.

It is an object of the present invention to provide an epitaxial technique for the deposition of a semiconductor type crystal film upon a substrate in such a manner that diffusion is substantially reduced and/or made more controllable. An additional object is to greatly reduce contamination in an epitaxially grown film. A further object is to provide a process for producing semiconductor devices with sharp junctions. Yet a further object is to provide a process for making an epitaxially grown crystal having reproducible and measurable characteristics.

Figure 2:
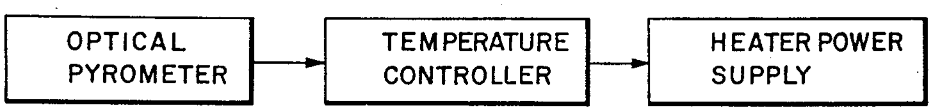

Other and further objects will become apparent from a reading of this specification, including the specific description and examples given hereinafter, and from reference to the accompanying drawing wherein FIGURE 1 is a perspective view of a reactor for practice of the epitaxial growth process and FIGURE 2 is a block diagram illustrating how temperature may be controlled in the epitaxial growth process.

According to this invention, the above objects are realized by forming a stabilizing layer of crystalline structure at normal deposition temperatures, and thereafter shifting the temperature substantially to a lower temperature and completing the deposition of the epitaxial layer at such lower temperature.

In accordance with a preferred embodiment of this invention, an improvement is provided in the process for epitaxial crystal growth wherein a solid epitaxial layer of monocrystalline structure is grown upon a crystal base at an elevated temperature by nucleation of a semiconductor material from the gaseous phase upon a surface of the crystal base followed by continued growth of the epitaxial layer by the deposition of additional semiconductor material from the gaseous phase upon the exposed surface of the growing epitaxial layer. The improvement comprises lowering the temperatures of the crystal growth surface of the epitaxial layer below the normal minimum continuous deposition temperature of the semiconductor material to a temperature above the polycrystalline formation temperature of the semiconductor material at any selected time after a layer of the epitaxial material no less than about one-tenth micron in thickess has grown, and thereafter continuing the growth process at the lower temperature.

In a specific preferred embodiment of the present invention, a silicon layer is epitaxially grown upon a compatible base crystal by initially forming a layer of at least about 0.1 micron thickness at a temperature no less than about 1250° C., and thereafter, well before the completion of epitaxial deposition, lowering the temperature substantially below 1250° C., but no lower than about 1000° C., to complete deposition of the epitaxial film. In another specific preferred embodiment, a germanium layer is epitaxially grown upon a base crystal by initially forming a layer of at least about 0.1 micron thickness at a temperature no less than about 725° C., and thereafter, well before completion of epitaxial deposition, lowering the temperature substantially below 725° C., but no lower than the polycrystalline deposition temperature, preferably no lower than about 600° C., to complete deposition of the epitaxial film.

FIGURE 1 illustrates a reactor in which the epitaxial process may be practiced. Quartz reactor vessel 11, having gas inlet 13 and gas outlet 15, houses a graphite resistance heater 17. Heater 17 is cantilever supported by and power fed from stainless steel conducting rods 19 and 21, which extend through and are supported by disk closure 22 at the right end of reactor 11, as viewed in FIGURE 1. Rods 19 and 21 are connected across the terminals of a conventional power supply, not shown. Closure 22 is held against the outer face of flange 23 on reactor 11 by clamps 25.

In operation, a gaseous mixture containing a reducing agent, a relatively low percentage of a compound containing the desired semiconductor material, and a controlled trace of dopant is passed through the quartz reactor 11, wherein the mixture contacts the heated crystal substrates 27 which are supported by graphite heater 17. Conventional accurate control means, in cooperation with temperature and sensing means, control the power input to rods 19 and 21 in response to temperature in order that the temperature of the growth surface of a crystal substrate 27 may be maintained at a desired value. For example, as shown in block form in FIGURE 2, an optical pyrometer, disposed to sense crystal upper surface temperature, feeds its output into a temperature controller, which may be set to the desired temperature. The temperature controller activates the power supply to the heater when the temperature sensed is below the desired value and cuts off the power supply to the graphite heater when the temperature rises above the desired value.

Epitaxial deposition of the semiconductor material in the gaseous mixture occurs upon the heated exposed surface of the substrate crystals, the deposited layer joining the lattice structure of the substrate in such a way that essentially a single crystal is formed. In accordance with the prior art, the operating temperature for the above process was maintained at essentially a constant value.

A better appreciation of this invention will be obtained by considering an application of the prior art technique of the epitaxial process. The deposition of a silicon layer upon a silicon substrate will now be described as such an application.

The graphite heater 17, bearing the series of substrates 27, is heated for about 10 minutes to 1300° C. while passing pure hydrogen through the reactor to remove oxide and surface contaminants. Thereafter, feed gas, at ambient temperature, consisting of 99 percent by volume hydrogen, one percent by volume silicon tetrachloride, and a controlled trace of dopant is introduced at a flow rate of forty liters per minute and allowed to flow at this rate through the reactor, which has an internal diameter of 2¾ inches, until the total desired thickness of epitaxial crystal layer is deposited. If the substrate is of an N+ type, then the dopant gas may be, for example, phosphorous trichloride gas, in order to produce an N type layer by deposit of phosphorus. If the substrate is of the P+ type, the dopant gas might be, for example, diborane in order to produce a P type layer by deposit of boron. Various dopant concentrations may be used depending upon the desired characteristics of the crystalline layer, but concentration will be, for example, on the order of 50 parts per billion. Such a minute quantity of the dopant may be accurately provided by the well-known method of successive dilution.

Pressure in the reactor is approximately atmospheric throughout the process. During deposition, according to the prior art technique, crystal growth surface temperature in the reactor was maintained at a desired constant value. For the silicon deposition system and technique described, this temperature was a constant value lying between about 1250° C. and 1360° C.

The epitaxial units obtained by the above process will vary in resistivity, as would be expected, according to the thickness of the epitaxial layer deposited. In any event, the epitaxial layer of the resulting unit invariably contains a substantial amount of P, or N, as the case may be, dopant which has diffused from the dopant-rich substrate into the epitaxial layer. Moreover, considerable contamination is evidenced from a close inspection of the resulting product. Attempts to measure the thickness of the deposited layer by infrared reflectance techniques often produces inexact results because of poor resolution.

For purposes of comparison, a series of five specific examples of the prior art technique are now presented.

*Example 1*

The process described above was conducted at the gas flow rate of forty liters per minute and a crystal growth surface temperature of 1300° C. The substrate was a silicon P+ type having a thicknes sof about five mils. It was generally cylindrical in cross section and had a diameter of about one inch. It contained approximately one part per million of boron dopant. The feed gas through the reactor was a mixture of about 99 percent hydrogen and 1 percent silicon tetrachloride. It contained about fifty parts per billion diborane as dopant. After 15 minutes of deposition run time, the flow of feed gas was stopped and pure hydrogen run through for about 30 seconds to flush the system. Thereafter, the graphite heater was shut off and, after the system cooled, the hydrogen gas flow was stopped. The substrate, with its newly acquired epitaxial layers (the new unit being sometimes referred to herein as an "epitaxial unit") was removed from the reactor for inspection. Considerable diffusion was found to have occurred from the substrate into the epitaxial layer. Also, the effects of contamination were noted to be substantial. Infrared reflectance measurements gave poor resolution. The epitaxial crystal layer was, however, of a relatively high quality, considered from a crystal defect standpoint. It had about 65,000 dislocations per square centimeter and about 100,000 stacking faults per square centimeter.

*Example 2*

In an effort to cut down contamination and diffusion the above epitaxial deposition process was repeated, using the same apparatus, technique, materials and conditions except for temperature, which was maintained throughout the process at 1250° C. instead of 1300° C. Improvement was noted in the amount of diffusion that occurred and the contamination level; also, better resolution was obtained in infrared reflectance measuring technique. However, although the crystal was still within what is normally considered acceptable quality limits, the number of dislocations and stacking faults in the epitaxial layer increased considerably as a result of the 50° C. lower temperature employed. The product of the 1250° C. run had about 130,000 dislocations per square centimeter and about 180,000 stacking faults per square centimeter, as compared to 65,000 and 100,000 in the 1300° C. run (Example 1).

*Example 3*

The above process was repeated, but at a temperature of 1200° C., other conditions remaining the same. The stacking fault count had risen to around 300,000 and the dislocation count around 200,000 per square centimeter. The quality of the crystal at this time was considered unacceptable for many applications as a result of the high number of imperfections. It is therefore seen that a temperature in the vicinity of 1250° C. (Example 2) is the minimum continuous deposition temperature at which quality crystal may be obtained.

*Example 4*

The product obtained from repeating the above process at 1100° C. had a dislocation count of about 350,000 per square centimeter and a stacking fault count of over 700,000 per square centimeter.

*Example 5*

The product obtained from running the above process at 1050° C. had a dislocation count of around 400,000 and a stacking fault count of in excess of 1,000,000. This is a product of exceptionally low quality and is unacceptable for nearly all purposes in constructing semiconductor devices.

Referring to the foregoing Examples 1–5, it was noted that there was a reduction in the amount of diffusion and less evidence of contamination in the product obtained at lower temperatures. The value of such reduction was more than offset as a result of the poor crystal structure of the epitaxial unit.

The following examples illustrate how diffusion and contamination are substantially suppressed in accordance with the present invention, while at the same time a high quality crystal is obtained.

*Example 6*

A substrate of the type of Examples 1–5 was heated to 1300° C. and a feed gas of the composition of the prior examples was introduced at the same flow rate therein employed. After a short interval of reaction time had passed, about 30 seconds, at which time a monocrystalline layer of approximately one-half micron thickness had been deposited upon the substrate, the temperature was shifted by changing the temperature control device to a setting of 1100° C., and thereby reducing the temperature of the heater strip so that the temperature of the exposed surface of the growing epitaxial layer was 1100° C. The run was continued an additional 14½ minutes, that is, until a total of 15 minutes run time had passed. The epitaxial layer obtained was found to have stacking faults and dislocations of about 100,000 and 65,000 counts per square centimeter, respectively. Therefore, although a large part of the total run was conducted at a temperature far below 1300° C., still the crystal layer produced had a quality substantially the same as if the entire layer had been deposited at 1300° C. On the other hand, a decrease in diffusion and contamination had occurred. The total diffusion into the epitaxial layer was on the order of approximately one-fifth of that which was experienced when the complete epitaxial process was conducted at the higher temperature of 1300° C., and the amount of contamination was substantially reduced. Moreover, the distance of migration of substantial quantities of dopant into the epitaxial layer was only about one-fifth as far as in a product of comparable layer thickness obtained by a constant 1300° C. temperature.

*Example 7*

The process of Example 6 was repeated in all particulars except the temperature shift was conducted after about 6 seconds instead of 30 seconds, the thickness of the epitaxial layer at that time being around one-tenth of a micron. The total deposition run time of about 15 minutes was then completed at the lower 1100° C. temperature. As in Example 1, it was found that a high quality crystal was obtained, having about the same number of stacking faults and dislocations per square centimeter as if the entire run had been conducted at 1300° C. An even greater reduction in the amount of diffusion and contamination was noted in the product of this example than was observed in the Example 6 product.

*Example 8*

The procedure of Example 7 was repeated, except the temperature was shifted after only 2 seconds of deposition run time had passed. The product was found to be unacceptable for practically all applications because of a very poor quality epitaxial crystalline layer which had a generally polycrystalline structure.

From reference to Example 8, it appears evident that a certain minimum thickness must be present in the initial layer before the temperature may be shifted substantially to low values. In the case of Example 8, the thickness when the temperature was lowered was about three or four hundredths of a micron, which was not sufficient. The precise thickness and times being quite small and rather difficult to measure with great accuracy, the exact point where the layer becomes thick enough for the temperature shift technique to work effectively could not be located with great certainty, but it lies somewhere in the neighborhood of one-tenth of a micron, being greater than four-hundredths of a micron. In any event, initial nucleation must occur at the higher temperature and a properly oriented monocrystalline lattice started prior to the time that the shift is made if a satisfactory product is to be obtained.

*Example 9*

Example 6 was repeated in all respects except the initial operating temperature was 1250° C. instead of 1300° C. The product was found to be comparable in quality to a product obtained by running at 1250° C. for the entire deposition. On the other hand, a substantial reduction in diffusion and contamination was observed in the end product compared to a product obtained by running at 1250° C. for the entire period.

*Example 10*

Eight runs were conducted in the manner of Example 6, all conditions being the same except the initial temperature was 1330° C. in all cases and the temperature to which the substrate was shifted after 30 seconds was as follows for each respective run: 1295° C.; 1280° C.; 1230° C.; 1172° C.; 1076° C.; 1110° C.; 1052° C., and 1026° C. A high quality crystal was obtained on all runs. The greater the temperature shift, i.e., the lower the second temperature, the less the diffusion and contamination in the epitaxial unit obtained. Total thickness of the epitaxial crystal layer in the epitaxial units made in this example varied from 16.95 microns, in the case of the 1295° C. shift temperature, to 9.83 microns in the case of the 1026° C. shift temperature.

*Example 11*

The procedure of Example 6 was repeated except the temperature to which the shift was made after 30 seconds lapsed time was approximately 900° C. The final product was found to be of an unacceptable quality for most purposes since it had a polycrystalline structure.

*Example 12*

Example 6 was repeated following the same procedure in all respects except that the temperature to which the system was shifted was 1000° C. A satisfactory product was obtained having a quality far in excess of that which would be normally expected at a 1000° run, in fact, having a quality almost as high as if the run had been conducted at 1300° C. throughout. The epitaxial unit obtained was superior to those obtained from constant temperature runs, in that the amount of diffusion that occurred was found to be quite small relative to that experienced in constant temperature runs at normal operating ranges. Little contamination was evidenced.

*Example 13*

The process of Example 6 was adapted to deposit a layer of germanium substrate. The feed gas contained 99 percent by volume hydrogen, 1 percent by volume germanium tetrachloride, and 50 parts per billion of diborane as dopant. The substrate was germanium of the P+ type, containing approximately 1 part per million of boron dopant. Operations were conducted as in Example 6 except that the initial operating crystal surface temperature was 825° C. and the temperature to which the crystal growth surface was shifted was 675° C. The shift was made after about one-half micron of material had been deposited on the substrate, which occurred after about 30 seconds, and the run was continued at this temperature until a total run time of 15 minutes had passed. The crystal structure of the epitaxial layer of germanium on the epitaxial unit so produced was of high quality, comparable to the quality of a layer deposited at a constant normal operating temperature of 850° C. Total diffusion of dopant into the epitaxial layer was much less for the epitaxial unit of this example than for one produced at the constant normal operating temperature of 850° C.; likewise, less evidence of contamination was observed in the unit of this example. As was the case in the epitaxial units of silicon produced in Examples 6–11, the dopant gradient was much steeper in the unit of this example than in a constant operating temperature produced unit. A second germanium run, conducted the same as above except at a shift temperature of 600° C., produced an epitaxial unit of satisfactory crystal quality that had even less dopant diffused into the epitaxial layer and that showed even less evidence of contamination.

*Example 14*

The process of Example 6 was repeated except that an N+ slice of monocrystalline silicon containing about one part per million of phosphorous as dopant was utilized as a substrate and 50 parts per billion of phosphorous trichloride were substituted in the feed gas in the place of the diborane therein employed. A high quality N on N+ epitaxial unit with total low diffusion, a steep diffusion gradient, and showing little evidence of contamination, when compared to a device produced at the normal constant operating temperature, was obtained from this process.

*Example 15*

The process of Example 6 was repeated, except that the base or substrate employed was the product obtained in Example 14, i.e., a generally cylindrical monocrystalline N on N+ epitaxial unit with the N+ portion having a thickness of about 5 mils and the N epitaxial layer having a thickness of about 15 microns. The N on N+ unit was oriented on graphite strip 17 of FIGURE 1 with the exposed N face pointing upwardly. The silicon from the feed gas, together with boron from the trace of diborane in the feed gas, is deposited upon the N layer to form a high quality epitaxially produced P-N device having little total dopant diffused either into the N or P layer and having a sharper P-N junction, i.e., a junction with very steep dopant concentration gradients from the point of juncture, than was possible by prior art techniques.

This invention has been found to be applicable generally to semiconductor-type compounds as well as elements. For example, gallium phosphide may be grown epitaxially on a gallium arsenide substrate by the techniques previously described, the feed gas containing about one volume each of gallium trichloride and phosphorous trichloride per 100 volumes of hydrogen gas. A controlled trace of conventional dopant, barium for example, is present in the feed gas. For best results, the temperature is shifted after a layer of about 4 microns has formed; however, the shift may be made any time after initial nucleation has been completed and a stabilizing layer of gallium phosphide crystal has been deposited.

Quite obviously, varied temperatures will be involved for the different semiconductor materials, each temperature series being characteristic of the particular material. However, the technique is the same. Any time after a small period of initial operation and a thin, stabilizing layer of crystal material has been deposited, temperature is shifted substantially downward to greatly reduce the amount of diffusion occurring and to reduce contamination. A temperature shift of as much as 20° gives noticably increased results, contamination and diffusion being substantially lowered; however, a temperature shift of at least 50° C is preferred. In the case of silicon, it is seen that the temperature may be dropped as much as from between two to three hundred degrees centigrade below the minimum normal operating temperature and a high quality unit or device still obtained which has a radically decreased quantity of dopant diffused into the epitaxial layer and shows less evidence of contamination.

For various semiconductor materials, the temperature may be shifted more or less depending upon the material. In the case of silicon, the lower limit results when polycrystalline structure begins to form in the epitaxial layer, in the vicinity of 900° C. to 1000° C. While minimum limits for the temperature shift for all semiconductor materials cannot be generalized in degrees, this minimum may be generalized as that temperature where polycrystalline structures, i.e., structure with grain boundaries, begins to form in the epitaxial layer and is thus readily ascertainable for a given material.

As shown in Example 15, the above temperature shift may be applied to the growth of a second epitaxial layer on a first layer. While Example 15 was directed to the application of this invention to deposit a P layer on an N layer, an N layer may be deposited upon a P layer instead. In turn, additional layers may be applied as desired. Epitaxial devices so produced have quite sharp junctions with little diffused dopant material on either side of the junction. This characteristic is most valuable in some semiconductor devices.

The present technique may be varied in order to control the amount of diffusion to certain desired values. For example, it may be preferred to make the temperature shift after a longer period or short period of time, depending on the amount of diffusion desired. Likewise, the number of degrees selected for a drop in temperature may be more or less, depending upon desired results. Even though considerable control can be realized by such selection of variables, diffusion will be less in all instances than would have been experienced by running at the constant initial operating temperature throughout the growth process.

As is well kown in the art, a variety of dopants may be used in the epitaxial process. These same dopants may be used in practicing this invention.

The temperature shift characteristic of the instant invention may be accompanied by a shift in certain other conditions, if desired. For example, flow rate and/or concentration of the semiconductor carrying compound of the gaseous feed may be increased. This may be desired in some instances to overcome the slightly reduced rate of deposition which will occur at the lower temperature selected and thus decrease total reaction time in laying a film of desired thickness. It is pointed out, however, that this reduction in deposition rate is not very significant since the tendency toward additional diffusion during the somewhat longer period of exposure required to deposit a layer of the same thickness is much more than offset by the reduction in diffusion rate at the lower temperatures. This is readily appreciated since diffusion rates vary exponentially with absolute temperature.

Throughout this specification, including the claims, the term "minimum normal continuous deposition temperature" refers to that temperature below which crystal structure of unacceptable quality is grown when the epitaxial process is conducted at a single deposition temperature. The term "polycrystalline deposition temperature" refers to that temperature at which polycrystalline structure commences to form during the epitaxial process. Hence, it is important that temperature be shifted no lower than the polycrystalline deposition temperature.

It is preferred, but by no means essential, that the temperature shift characteristic of this invention be made at such a time during the process that at least as much material will be epitaxially deposited after the shift as was deposited prior to the shift.

It is seen that this invention provides an important improvement in the process of epitaxially growing crystals by first nucleating at a temperature as high or higher than the minimum normal continuous operating temperature, and, at a desired time after orderly nucleation is complete and a stabilizing layer of epitaxially deposited crystal has formed, substantially shifting operating temperature downwardly.

Specifically, a process has been described for limiting diffusion in epitaxial growth by depositing a layer of a minimum thickness of about 0.1 micron at a temperature at least as high as the minimum normal continuous operating temperature and at anytime thereafter, but well prior to completion of deposition, shifting the temperature substantially downwardly to a value below the minimum normal continuous operating temperature but lower than the polycrystalline deposition temperature.

This invention has been shown to be applicable generally to the epitaxial growth of semiconductor crystals, including, for example, silicon, germanium, gallium phosphide and gallium arsenide.

Having described the invention in connection with certain specific embodiments thereof, it is to be understood that further modifications may now suggest themselves to those skilled in the art and it is intended to cover such modifications as fall within the scope of the appended claims.

What is claimed is:

1. An improvement in the process for epitaxial crystal growth wherein a solid epitaxial layer of monocrystalline structure is grown upon a doped crystal substrate at an elevated temperature by nucleation of a semiconductor material from the gaseous phase upon a monocrystalline surface of the crystal substrate followed by continued growth of said epitaxial layer by the deposition of additional semiconductor material from the gaseous phase upon the exposed surface of the growing epitaxial layer the improvement in combination therewith comprising epitaxially growing a stabilizing monocrystalline layer on said substrate at said elevated temperature, thereafter lowering the temperature of the crystal growth surface of the said stabilizing layer to a temperature above the polycrystalline formation temperature of said semiconductor material, and continuing the growth process of said layer at the lower temperature.

2. The improved process of claim 1 wherein the semiconductor material is silicon and the temperature is lowered at least 100° C.

3. The improved process of claim 1 wherein the semiconductor material is germanium and the temperature is lowered at least 50° C.

4. An improvement in the process for epitaxial crystal growth wherein a solid epitaxial layer of monocrystalline structure is grown upon a doped monocrystalline substrate surface to form a rectifying junction, the growth being carried out at an elevated temperature by nucleation of material from a doped gaseous phase upon said surface of the crystal substrate followed by continued growth of the said epitaxial layer by the deposition of additional material from the gaseous phase upon the exposed surface of the growing epitaxial layer, the improvement in combination therewith comprising epitaxially growing a stabilizing monocrystalline layer on said substrate at said elevated temperature, thereafter lowering the temperature of the crystal growth surface of the said stabilizing layer below said elevated temperature to a temperature above the polycrystalline formation temperature of said epitaxially deposited material, and continuing the growth process of said layer at a temperature lower than said elevated temperature and above the said polycrystalline formation temperature.

5. An improvement in the process for epitaxial crystal growth wherein a solid epitaxial layer of monocrystalline structure is grown upon a doped crystal substrate at an elevated temperature by nucleation of a semiconductor material from the gaseous phase upon a monocrystalline surface of the crystal substrate followed by continued growth of said epitaxial layer by the deposition of additional semiconductor material from the gaseous phase upon the exposed surface of the growing epitaxial layer the improvement in combination therewith comprising epitaxially growing a monocrystalline layer on said substrate at said elevated temperature to a thickness of not less than about .1 of a micron and thereafter lowering the temperature of the crystal growth surface of said epitaxial layer below said elevated temperature to a temperature above the polycrystalline formation temperature of said semiconductor material, and continuing the growth process at the lower temperature.

6. The improved process of claim 5 wherein the temperature is lowered at least 50° C. below the said elevated temperature and wherein the deposition of material is continued after the temperature is lowered until the epitaxial layer formed is at least twice as thick as when the temperature was lowered.

7. The improved process of claim 6 wherein the epitaxial material being deposited is silicon, the said elevated temperature is above about 1250° C., and the polycrystalline formation temperature is no lower than about 1000° C.

8. The improved process of claim 6 wherein the epitaxial material being deposited is germanium, the said elevated temperature is above about 725° C., and the temperature is lowered to no less than about 600° C.

9. A process for epitaxial crystal growth comprising:

(a) passing a gaseous mixture comprising a silicon halide and hydrogen over the surface of a semiconductor crystal base containing dopant while heating said surface to a temperature of at least 1250° C. to nucleate silicon on said surface and grow an epitaxial monocrystalline layer of silicon thereon, (b) lowering the temperature of the exposed epitaxial crystal growth surface at least 50° C. but to a temperature no lower than 1000° C. after the thickness of crystal growth on said base is at least about one-tenth micron, and (c) continuing to pass said gaseous mixture over the crystal growth surface at said lowered temperature to deposit a comparatively thick additional crystal layer compared to the thickness of the epitaxially deposited layer at the time when the temperature was lowered in step (b).

10. The process of claim 9 wherein the dopant in the crystal base is selected from the group consisting of P and N type dopants and the gaseous mixture contains dopant selected from the same group and of the same type, the ratio of dopant to silicon contained in the gaseous mixture passed above the crystal growth surface being at least an order of magnitude less than the ratio of dopant to silicon in the base and wherein the temperature is shifted to at least 1150° C., but no lower than 1050° C.

11. The process of claim 10 wherein the temperature is not shifted until a crystal layer of at least one-half micron in thickness has grown.

12. A process for manufacture of an epitaxial unit comprising:

(a) passing a gaseous mixture consisting essentially of a relatively small quantity of silicon trichloride, a relatively large quantity of hydrogen, and a controlled trace of dopant selected from the group consisting of N and P type dopants over the surface of a semiconductor crystal base containing dopant selected from said group and of the same type while heating said surface to a temperature of between about 1250° C. and about 1360° C. to nucleate silicon on said surface and initiate growth of an epitaxial monocrystalline layer of silicon thereon, (b) lowering the temperature of the exposed epitaxial crystal growth surface at least 50° C. but to a temperature no lower than 1000° C. after the thickness of crystal growth on said base is at least about one-tenth micron, and (c) continuing to pass said gaseous mixture over the crystal growth surface at said lowered temperature to deposit a comparatively thick additional crystal layer compared to the thickness of the epitaxially deposited layer at the time when the temperature was lowered in step (b).

References Cited by the Examiner

AIME Publication, Metallurgy of Semiconductor Materials, Aug.30–Sept. 1, 1961, volume 15, pages 93 and 98–101.

DAVID L. RECK, *Primary Examiner.*